J. C. MESSICK.
HYDRAULIC VARIABLE SPEED TRANSMISSION DEVICE.
APPLICATION FILED JUNE 30, 1913.
1,119,976.
Patented Dec. 8, 1914.
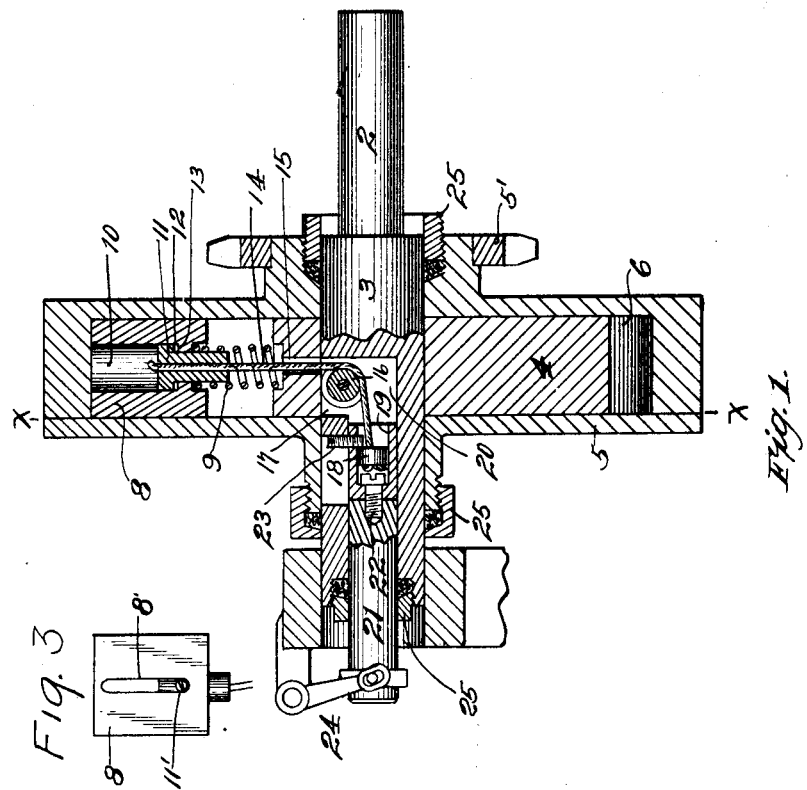
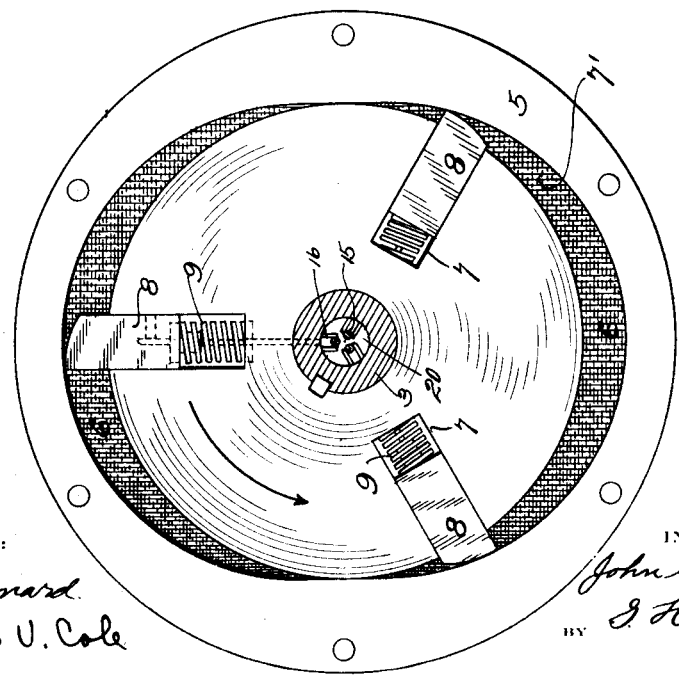
WITNESSES:
F. E. Maynard.
Frances V. Cole
INVENTOR
John C. Messick
BY J. H. Strong
ATTORNEY

UNITED STATES PATENT OFFICE.

JOHN C. MESSICK, OF SAN FRANCISCO, CALIFORNIA, ASSIGNOR OF ONE-HALF TO JULES A. ZIMMERLIN, OF SAN FRANCISCO, CALIFORNIA.

HYDRAULIC VARIABLE-SPEED-TRANSMISSION DEVICE.

1,119,976. Specification of Letters Patent. Patented Dec. 8, 1914.

Application filed June 30, 1913. Serial No. 776,540.

*To all whom it may concern:*

Be it known that I, JOHN C. MESSICK, a citizen of the United States, residing in the city and county of San Francisco and State of California, have invented new and useful Improvements in Hydraulic Variable-Speed-Transmission Devices, of which the following is a specification.

This invention relates to a power transmission apparatus, and particularly to a hydraulic power transmitter.

It is one of the objects of the present invention to provide a simple, reliable, easily controlled mechanism in which a fluid element is disposed, and which element can be utilized as a medium for the control of the speed of a driven part with relation to the speed of a driving part.

It is a particular object of the present invention to provide a novel and reliable valve and valve operating means for controlling the relative speeds of the driven and driving parts through the medium of the fluid.

The invention consists of the parts and the construction and combination of parts as hereinafter more fully described and claimed, having reference to the accompanying drawings, in which—

Figure 1 is a longitudinal vertical section partly in elevation of the device. Fig. 2 is a section on line X—X, Fig. 1, looking toward the driving disk. Fig. 3 is a side elevation of one of the valves.

This transmission device consists of a driving shaft 2, having a body portion 3 of suitable length and diameter, upon which is keyed or otherwise securely fastened a disk 4 rotatably fitting a casing 5 loose on the shaft 3 and having a substantially oval-shaped chamber forming at opposite faces of the disk 4 substantially crescent-shaped pockets 6. The minor diameter of the oval-shaped chamber is substantially equal to the diameter of the disk 4 but provides a running fit therefor.

The opposite pockets 6—6 are to be filled with a fluid, indicated at 7', and in the piston 4 there are formed radial equidistant slots 7 of suitable proportions in which are radially movable valves or abutment members 8. The valves 8 are normally projected outwardly by respective springs 9 reacting between the inner ends of the valves and the bottoms of the slots 7. If the valves 8 were allowed to constantly project outwardly into bearing contact with the surface of the chamber of the casing 5, the abutment faces thereof would press against the confined fluid in the pockets 6, by reason of the rotation of the disk 4, and confine the fluid in front of the valve 8 in its respective pocket 6, and thereby the resistance of the fluid under pressure of the valves 8 would cause the casing 5 to revolve with the disk 4 at a speed substantially equal to the speed of rotation of the piston 4.

One of the important objects of the invention is to be able to so position the valves 8, with relation to the piston 4 and the inner wall of the chamber of the casing, that the liquid in the pockets may escape from in front of the valves 8 over the ends thereof into the pocket portions on the rear side of the moving valves 8. The rapidity with which the liquid in the pockets can change its respective positions from in front of the valves to the rear of the valves determines the relative speeds of the driving member 4 and the frictionally driven member 7. For the purpose of controlling, therefore, the radial positions of the several valves 8, with relation to the disk 4, the valves are each longitudinally chambered, as at 10, to receive a plunger 11 having a head 12 adapted to engage a seat 13 in the bottom of the chamber 10; each plunger 11 being attached to the outer end of a respective wire or cable 14 which passes centrally through the projecting springs 9 and through the passageway 15 formed for its reception in the central portion of the disk 4. The cables 14 pass around respective guide rollers 16 journaled in radial slots 17 of the shaft body 3, and over which rollers the cables 14 are directed longitudinally toward a button 18 in which they are securely attached.

The button 18 is mounted in a cup or socket 19 which is centrally and movably supported in a longitudinal chamber 20 of the shaft body 3, in which chamber there is movably supported a shifter or spindle 21 to which the socket 19 is turnably secured by a screw or other appropriate connection 22. The socket 19 is provided for longitudinal movement, with relation to the shaft body 3, and prevented from circumferential movement thereto by a stop screw 23 projecting radially from the socket 19, and which also serves as a means for holding the removable button 18 in the socket.

When it is desired to change the position, radially, of the valves 8 of the disk 4, the operator simply shifts the shiftable spindle 21 axially by means of a lever 24 or other appropriate device, thus pulling on the socket 19 and drawing or releasing the cables 14, which are turnably connected to the spindle 21, and consequently permits shifting of the plunger 11. If the shifter 21 be moved inwardly, then the springs 9 force the valves 8 outwardly to take up the slack of the cables 14 by forcing the valves against the heads 12 of the plungers 11 which will be held in a predetermined position under control of the lever or other shifter 24. If it be desired to retract the valves 8, then the operator throws the lever 24 to partly withdraw the shifting device 21 and pull the cables 14 downwardly, thus bringing the plungers 11 into engagement with their respective seats 13 of the valves and drawing the latter inwardly the desired distance. In case the valves are fully retracted, then the disk 4 would rotate freely within the chamber of the casing 5, and since the valves 8 would be so far receded as to not act resistively upon the liquid in the pockets 6 there would be no motion transmitted to the driven member 5, which of itself may be utilized as a pulley or provided for attaching a gear or power transmitting device 5'.

Any suitable means may be utilized to attach the cables 14 to their respective plungers 11, and in the present instance there are provided screws 11' which are threaded in the bodies of the plungers or controllers 11, the screws 11' moving in the slots 8' formed for their reception in one side of the valves 8.

In order to prevent leak of the fluid in the pockets 6, when subjected to pressure of the valves 8, there are provided suitable packing glands 25 at the several running joints at which leak would be likely to occur.

Having thus described my invention, what I claim and desire to secure by Letters Patent is—

1. In a power transmitting mechanism, a driving member and a driven member which incloses the driving member, spring pressed valves carried by the driving member, a shaft on which said members are mounted, said shaft having a longitudinal chamber extending through one end thereof and also having radial slots which communicate with the chamber, a roller journaled in each slot, a socket member slidable in said chamber, cables connected to the valves and passing over said rollers, a button to which the inner ends of the cables are connected, said button being arranged in said socket member, a stop screw projected through the socket member and having one end engaged with the button to hold same within the socket and having its opposite end projecting outwardly beyond the socket member and slidably arranged in a longitudinal slot provided therefor in the shaft, a member connected to said socket member and being slidable in said chamber and extending beyond an end of the shaft, and means to slide said element.

2. In a power transmitting mechanism, a driving member and a driven member which incloses the driving member, spring pressed valves carried by the driving member, a shaft on which said members are mounted, said shaft having a longitudinal chamber extending through one end thereof and also having radial slots which communicate with the chamber, a member slidable in said chamber and having one end thereof projecting beyond said end of the shaft, means connected to said projecting end of said member to move same along the length of the chamber, and cables connected to said valves and being passed through the slots and connected to said member.

3. In a power transmitting mechanism, a driving member and a driven member which incloses the driving member, spring pressed valves carried by the driving member, a shaft on which said members are mounted, said shaft having a longitudinal chamber extending through one end thereof and also having radial slots which communicate with the chamber, a member slidable in said chamber and having one end thereof projecting beyond said end of the shaft, means connected to said projecting end of said member to move same along the length of the chamber, cables connected to said valves and being passed through the slots and connected to said member, and means on said member projecting outwardly from the periphery thereof and slidably extending into a longitudinal slot provided therefor in the shaft for holding the member against turning movement.

4. In a power transmitting mechanism, a driving member and a driven member which incloses the driving member, spring pressed valves carried by the driving member, a shaft on which said members are mounted, said shaft having a longitudinal chamber and radial slots that communicate with the chamber, a socket member slidable in said chamber, cables connected to the valves and being passed through the slots, means connecting the inner ends of the cables disposed in said socket, and combined means to hold the member against rotation relative to the shaft and to engage said cable connecting means to hold the latter in said socket.

5. In a power transmitting mechanism, a driving member and a driven member which incloses the driving member, spring pressed valves carried by the driving member, a shaft on which said members are mounted, said shaft having a longitudinal chamber and radial slots that communicate with the chamber, a member slidable in said chamber, each valve having a longitudinal chamber formed with a seat intermediate the chamber ends, a plunger in each chamber having a head which engages said seat and having its inner end extending beyond the inner end of the valve, cables passed through the plungers and being secured to the latter and being passed through the slots, means connecting the inner ends of the cables to the member, and means to slide the member in said chamber.

In testimony whereof I have hereunto set my hand in the presence of two subscribing witnesses.

JOHN C. MESSICK.

Witnesses:
JOHN H. HERRING,
W. W. HEALEY.